United States Patent
Bowerman

[11] Patent Number: 6,142,547
[45] Date of Patent: Nov. 7, 2000

[54] GAME DRAG AND METHOD

[76] Inventor: Raymond Bowerman, 11173 Garden Ridge, Freeland, Mich. 48623

[21] Appl. No.: 09/335,964

[22] Filed: Jun. 18, 1999

[51] Int. Cl.$^7$ ..................................................... B65G 7/12
[52] U.S. Cl. .......................... 294/150; 294/142; 294/153; 294/165; 224/921
[58] Field of Search ............................ 294/74, 137, 141, 294/142, 150, 153, 156, 164, 165, 82.14; 119/831, 834, 864; 54/24; 224/103, 921; 452/185, 187, 189

[56] References Cited

U.S. PATENT DOCUMENTS

| | | | |
|---|---|---|---|
| 464,283 | 12/1891 | Hush | 54/24 |
| 1,335,888 | 4/1920 | Fulton . | |
| 1,580,553 | 4/1926 | Brenny | 54/24 |
| 2,233,083 | 2/1941 | MacKenzie | 294/74 |
| 2,743,702 | 5/1956 | Sullivan | 119/864 |
| 2,819,923 | 1/1958 | Anderson | 294/74 |
| 3,188,130 | 6/1965 | Pietrowicz | 294/170 |
| 3,528,215 | 9/1970 | Johnson | 54/24 |
| 3,686,710 | 8/1972 | Shankland | 16/112 |
| 4,243,164 | 1/1981 | Burlison et al. | 224/52 |
| 4,317,257 | 3/1982 | Engel | 17/21 |
| 4,369,615 | 1/1983 | Bloodworth | 54/24 |
| 4,472,925 | 9/1984 | Woodruff | 54/24 |
| 4,529,240 | 7/1985 | Engel | 294/141 |
| 4,828,307 | 5/1989 | Sokol et al. | 294/79 |
| 5,088,272 | 2/1992 | Anderson et al. | 54/24 |
| 5,145,224 | 9/1992 | Welk | 294/2 |
| 5,603,545 | 2/1997 | Benson et al. | 294/150 |
| 5,951,080 | 9/1999 | Wessner | 294/165 |
| 6,065,790 | 5/2000 | Oswald | 294/150 |

*Primary Examiner*—Dean J. Kramer
*Attorney, Agent, or Firm*—John J. Swartz

[57] ABSTRACT

A game drag for dragging an animal including a flexible line having a draft handle end, an opposite end having a fixed snout loop formed therein for passing over the snout of an animal to be dragged, and an intermediate portion which passes through the fixed loop and forms a second adjustable loop that passes around a portion, such as the neck, of an animal to be dragged. The invention also contemplates a method of mounting a game drag, having a snout loop in one end of a flexible draft line, on a game animal including the steps of passing a portion of the line adjacent the snout loop around the neck of an animal to be dragged and through the snout loop to form a second variable size loop, mounting the snout loop on the snout of an animal to be dragged, and then applying tension to an opposite end of the line to partially close the second variable loop tightly about the animal's neck.

26 Claims, 3 Drawing Sheets

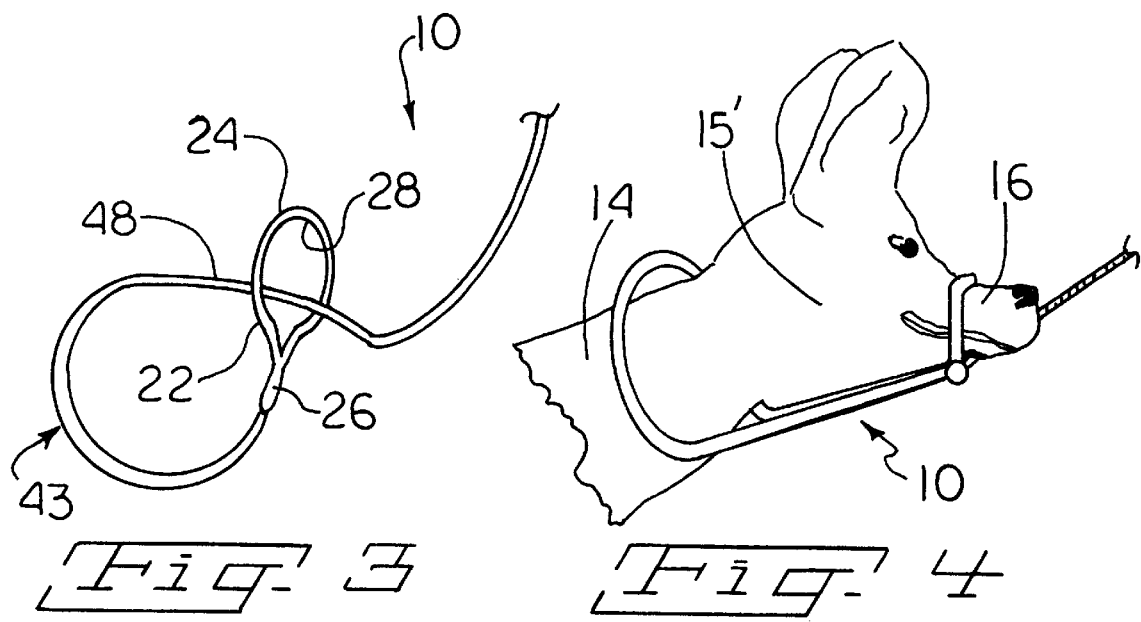
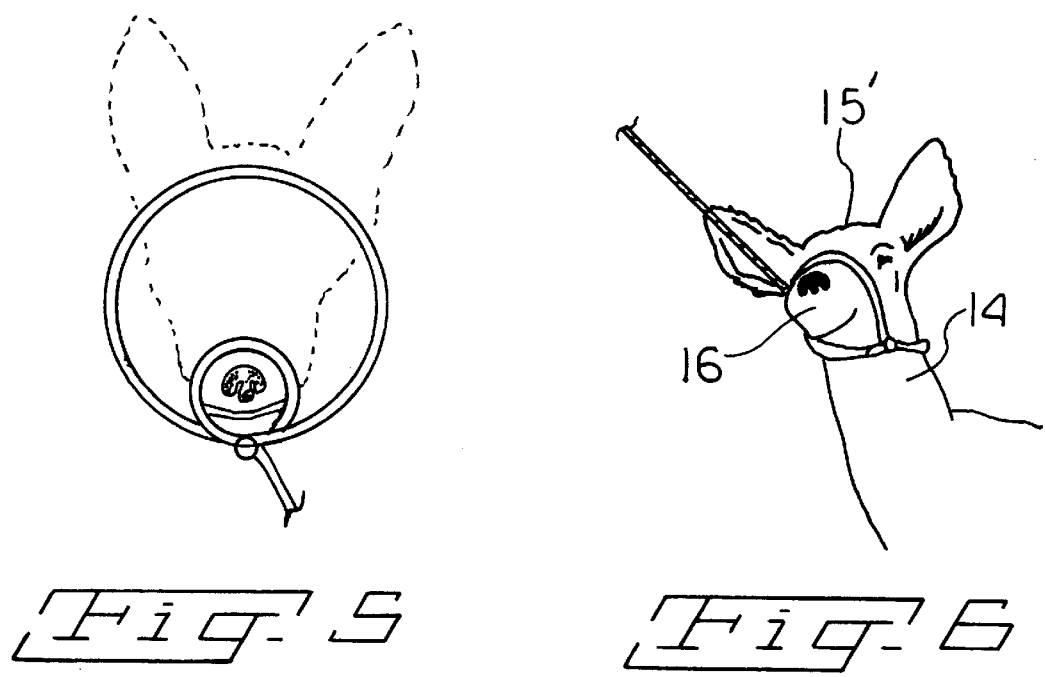

GAME DRAG AND METHOD

BACKGROUND OF THE INVENTION

1. Field of the Invention

This invention relates to a game drag and method of mounting a game drag on an animal.

2. Description of the Prior Art and Objects

The transportation of large game animals which have been killed in their natural habitat is problematic. Typically, game animals such as deer, moose and elk are shot in remote wooded areas and have to be manually dragged to a roadway. Hunters are frequently alone and thus, hunters have heretofore sometimes carried a rope which they tie around a portion of the deer such as the deer's neck. Deer are frequently dragged before rigor mortis sets in and thus this prior art technique allows the deer's head to droop downwardly and catch on obstacles. If the deer is antlered, the antlers, particularly if large, will also sometimes catch the dirt, brush, log, etc., and impede an already difficult transport. If two or more hunters are available, sometimes they will grab the rear legs of an animal and rearwardly drag the animal on the ground so that the antler points are rearwardly disposed and do not as readily engage brush or other obstacles. Unfortunately, it is difficult for a hunter to grip the legs of a deer.

It is more frequent that the animal is dragged head first. Sometimes the hunter will couple the rope to the base of the antlers, however, hunters frequently employ a taxidermist to mount the antlered deer head for display and are reluctant to allow the antlers to be tied to a rope which might mar or damage the antlers.

The problem of dragging a deer is further exacerbated if the deer does not include antlers. Accordingly, it is an object of the present invention to provide new and novel game drag for dragging a game animal.

It is another object of the present invention to provide a new and novel device for lifting the head of an animal as it is being dragged.

Still another object of the present invention is to provide a new and novel game drag for dragging a non-antlered deer.

A further object of the present invention is to provide a game drag having a snout loop which receives the snout of an animal to be dragged.

A still further object of the present invention is to provide a game drag having a flexible line with a snout receiving loop which passes over the snout of an animal to be dragged and another portion which passes around another portion, such as the neck, of the animal, and then passes through the snout loop.

A further object of the present invention is to provide a game drag having a flaccid line provided with a snout loop forming a fixed opening therein for receiving the snout of an animal to be dragged and another portion which passes around the neck of the animal and passes through the snout loop to form a variable opening which closes on the neck of an animal as tension is applied to a drag end of a line.

A still further object of the present invention is to provide a game drag of the type described including a drag end having a handle, an opposite end forming a snout loop for passing over the snout of an animal, an intermediate portion between the ends which passes through the snout loop and forms an adjustable loop which closes around the neck of an animal as tension is applied to the rope by the handle.

Still another object of the present invention is to provide a game dragging device of a type described including mechanism for hanging the flexible line on a support, such as a tree.

Another object of the present invention is to provide a game dragging device of the type described including a draft end having a hanging hook for hanging an animal being dragged on a vertical support, such as a tree.

Yet another object of the present invention is to provide a game dragging device of the type described including a draft end having a hanging hook which passes over a support, such as a tree limb, and is coupled back to the line to hang the animal from a tree.

A further object of the present invention is to provide a game dragging device of the type described including a third loop coupled to a draft end of the line for receiving a hanging hook coupled to the draft end of the line after it passes over a support, such as a tree limb, for hanging the game animal from the support.

A still further object of the present invention is to provide a game dragging device of the type described which includes a new and novel handle that is easier to lift and minimize the pain inflicted on the hands of the person dragging the animal.

Another object of the present invention is to provide a game dragging device of the type described including a flexible drag line having a handle coated with a layer of yieldable material.

Still another object of the present invention is to provide a game dragging device of the type described which will drag and concurrently lift the head of an animal being dragged.

Game dragging devices have been provided heretofore such as that disclosed in U.S. Pat. No. 4,243,164 issued to Larry J. Burlison on Jan. 6, 1981, which discloses a game dragging device that is coupled to the front legs of an animal and the neck of an animal. Unfortunately, this device allows the head and the antlers thereon allowed to droop downwardly and catch brush and the like. Also, this prior art device is relatively complicated and includes several moving parts which have to be adjusted and clamped before the device can be used. This prior art device utilizes nuts which must be threaded and are easily lost in the woods. A multiplicity of detachable parts is particularly cumbersome in the cold. Accordingly, it is another object of the present invention to provide a new and novel game drag which is one piece and easily mounted on an animal.

It is a further object of the present invention to provide a new and novel game drag of the type described which includes a fixed snout loop that fits over the snout of an animal to be dragged and includes another portion which is received in the snout loop for lifting the snout loop and the front of the head of the animal relative to the neck as the animal is being dragged.

Another object of the present invention is to provide a method of quickly and easily coupling a deer drag device to an animal and which will facilitate the lifting of the snout of an animal as the deer is being dragged.

A still further object of the present invention is to provide a new and novel method of mounting a deer drag to a game animal including forming a snout loop in a flexible drag line, passing another portion of the line around the animal's neck and through the snout loop to form a second variable loop, mounting the snout loop on an animal's snout, and then pulling on the line to close the loop lightly around the aninial's neck.

Still another object of the present invention is to provide a new and novel method for mounting a drag device on a game animal including the steps of forming a snout receiving loop in a flexible drag line, forming a neck receiving loop by passing an opposite end of the line through the snout receiving loop, and mounting the snout receiving loop on the snout of an animal and mounting the neck receiving line around a portion of a neck of an animal to be dragged.

U.S. Pat. No. 2,819,923 issued to D. Anderson on Jan. 14, 1958 discloses a sling for suspending a deer including a flexible line, such as a steel wire cable, having a permanent loop which passes over a tree limb and an adjustable loop. In this prior art device, the adjustable loop is coupled to a block which is then passed through the fixed loop and passed around the legs of an animal. This prior device is also fairly large and includes a number of parts. It is important that a game drag be easily foldable and placed into a hunter's pocket. Accordingly, it is another object of the present invention to provide a new and novel game drag of the type described which will fold and fit into a hunter's pocket.

Tugging a deer, which can easily weigh 200 pounds, can be painful to the hands. Accordingly, it is another object of the present invention to provide a new and novel deer drag which includes a flexible drag line having a snout loop at one end and a cushioned handle at the other end.

The prior art drag rope, which does not lift the front of the deer off the ground, results in increased friction between the deer hide and the ground being traversed. This device constructed according to the present invention will aid the hunter to lift the front portion of the deer off the ground and keep it from dragging and thus, minimize the effort required to drag the deer by reducing friction between the deer and the ground. Accordingly, it is another object of the present invention to provide a new and novel animal drag which will reduce the friction between the animal being dragged and the surface on which it is dragged.

Other objects and advantages of the present invention will become apparent to those of ordinary skill in the art as the description thereof proceeds.

SUMMARY OF THE INVENTION

A game dragging device for dragging a game animal comprising a flaccid game dragging member having a flaccid drag line including a portion for passing around a first part of an animal to be moved, and a snout lifting portion, coupled to the line and adapted to pass around a snout portion of an animal, for lifting the snout portion of an animal as the drag line is pulled. The invention also contemplates a method of mounting a deer drag on an animal which will lift the front of an animal's head as it is being forwardly dragged.

DESCRIPTION OF THE DRAWINGS

The invention may be more readily understood by referring to the accompanying drawings, in which:

FIG. 3 is a fragmentary side perspective view of the game drag more particularly illustrating the relationship between the two loops prior to being coupled to an animal, such as a deer;

FIG. 4 is a side perspective view illustrating a deer drag constructed according to the present invention with a fixed snout loop received over the snout of a non-antlered animal and another variable loop forming portion of the line passing around the neck of an animal and passing through the snout loop;

FIG. 5 is an end elevational view, taken from the right side of FIG. 4, illustrating the deer drag constructed according to the present invention, mounted on the head of a non-antlered deer which is illustrated in phantom;

FIG. 6 is an opposite side perspective view thereof;

DESCRIPTION OF PREFERRED EMBODIMENT

Figure 1:
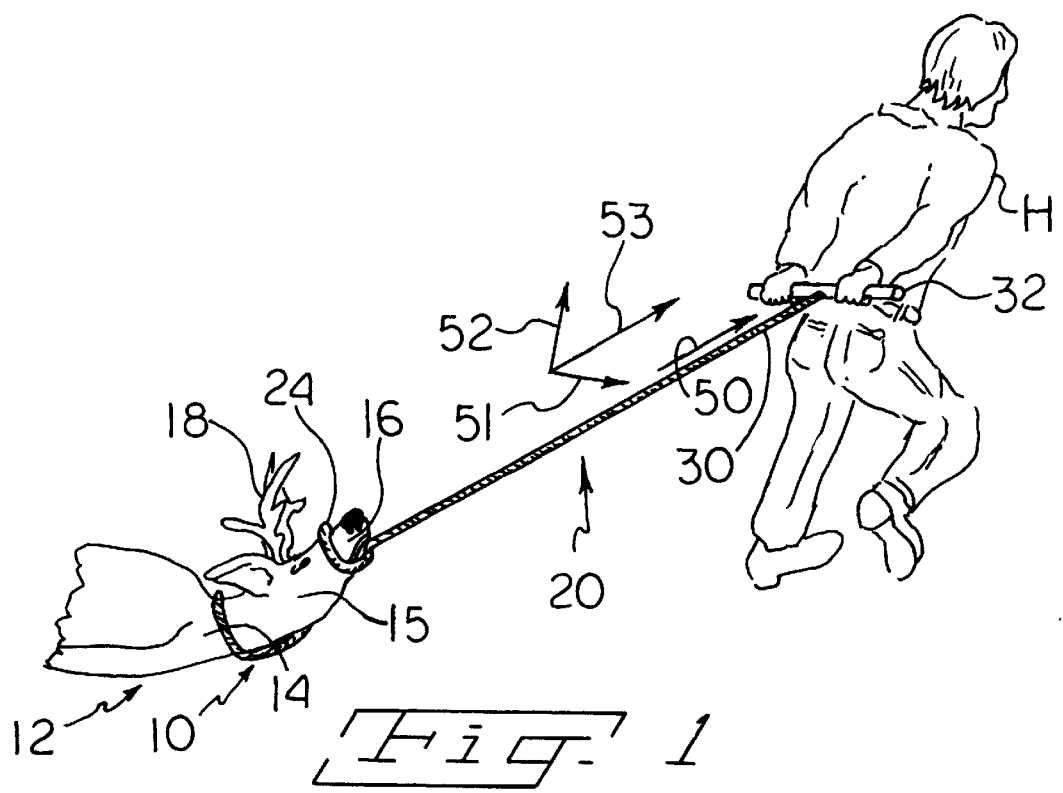
FIG. 1 is a side perspective view illustrating a game drag constructed according to the present invention mounted on the head of an antlered deer.
Figure 2:
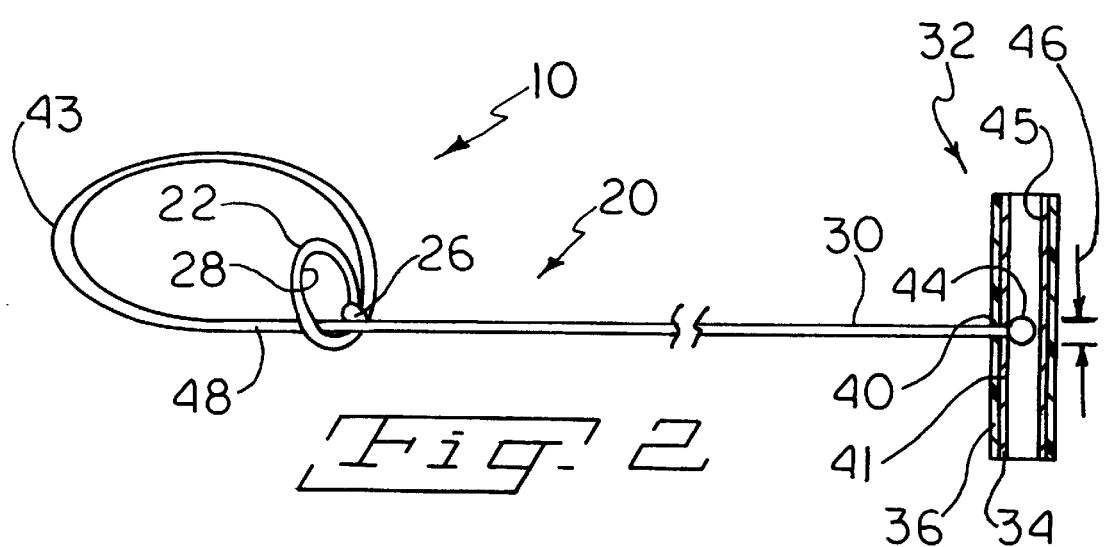
FIG. 2 is an enlarged side perspective view, partly in section, of the game drag device constructed according to the present invention, more particularly illustrating a fixed snout loop slidably receiving a variable loop forming portion of the line.

A game drag, generally designated 10, constructed according to the present invention, is particularly adapted for use in dragging a game animal, generally designated 12, having a neck 14 on which a head 15 is provided and includes a snout 16. The deer head 15, which may or may not include antlers, is illustrated in FIG. 1 to include antlers 18 whereas the deer head 15'illustrated in FIGS, 4–6, is not antlered.

The deer drag 10 comprises a flaccid or flexible line 20, such as a rope, having one end 22 folded upon itself and knotted to itself at 26 to form a snout loop 24. The snout loop 24 includes a fixed opening or passage 28 therethrough which is sized to pass over the snout 16 of an animal to be dragged.

The opposite end 30 of the line 20 is coupled to a handle, generally designated 32. The handle 32 includes a hollow cylinder 34 of solid material, such as plastic or fiberglass, covered with a layer 36 of soft flexible material, such as foam.

The hollow handle cylinder 34 may also be covered, coated or encapsulated with a sheet 36 or cylinder of expansible material such as rubber to cover the solid core 34. This construction provides a very soft handle which is easy to hold onto and provides a gentle surface on which the hunter places his hands to draw the animal 12 out of the woods. The terminal line end 30 passes through an aperture 40 in the side wall 41 of the handle 32 into the handle elongate passage 45 and includes a knot 44 which has a breadth 46 greater than the breadth of the passage 40. Rather than a knot 44, the rope could be folded over on itself or coupled to another clamp disposed within the handle passage 45.

The line 10 includes an intermediate portion 48 which passes through the passage 28 of the fixed loop 24 to provide an adjustable loop 43 that is adapted to pass around the neck 14 of the animal and adjust in size to the size of the neck as tension force, represented by the arrow 53, is applied in the direction of the arrow 50 by the hunter H pulling on the handle 32. The force 50 exerted on the line 20 will have a forward force component 51 for forwardly moving the deer 12 and a vertical force lifting force component 52 which will raise or elevate the snout 16 relative to the neck 14.

The Operation and Method

The game drag 10, including the snout loop 24 fixed therein, is carried in the pocket of a hunter H until the game animal 12 has been killed. The intermediate line portion 48 is passed around the top of the neck 14 and thence forwardly along the underside of the neck through the passage 28 in the fixed snout loop 24 to move the intermediate portion 48 therethrough to form the variable or adjustable loop 43.

Alternatively, before passing the intermediate portion 48 around the neck 14, the handle 32 and intermediate portion 48 can pass through the fixed loop passage 28 to form the variable loop 43, as illustrated in FIG. 3. The variable loop 43 thus formed is then passed over the head 14 and any antlers 18 and then the snout loop 24 is thereafter passed over the snout of the animal 16 to the position illustrated in FIG. 4.

In either event, the hunter will grasp and pull on the handle 32, in the direction represented by the arrow 53 to apply tension force, represented by the arrow 50, to the rope end 30. The intermediate line portion 48 will continue to move in the direction of the arrow 50 through the loop 28 to reduce the size of the variable loop 43 to tightly grip the neck 14. The tension force 53 exerted on the line, in the direction of the arrow 50, will include a horizontal force component 51 for forwardly dragging the animal and a vertical component which will lift the snout 16 and the head 14 upwardly to aid the dragging of the deer and minimize the head 15 engaging the earth's surface, brush or the like.

Alternate Embodiment

Figure 7:
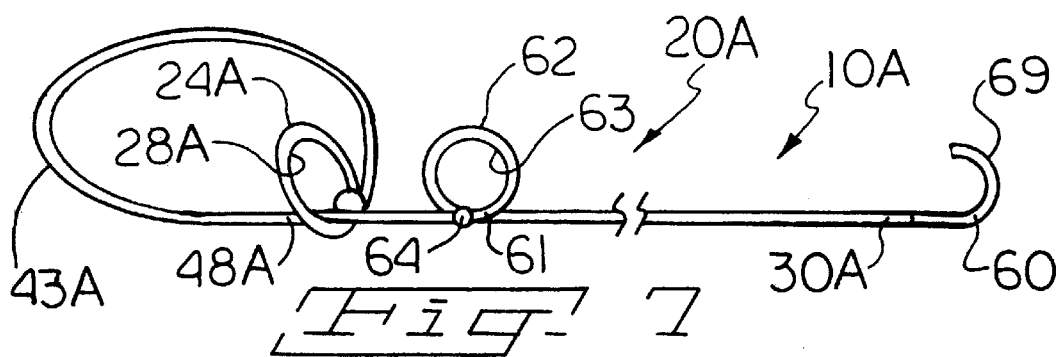
FIG. 7 is a side perspective view illustrating a slightly modified embodiment.
Figure 8:
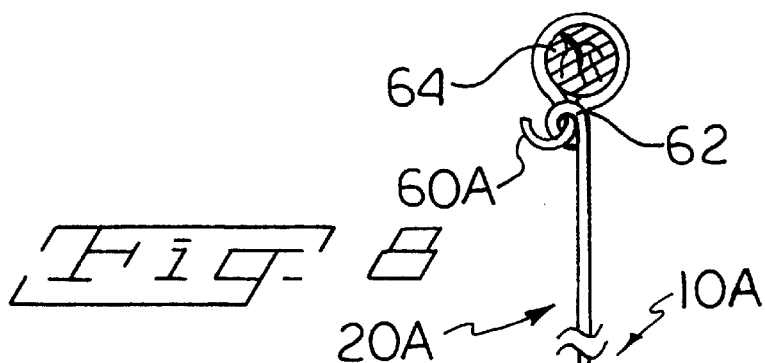
FIG. 8 is a side perspective view illustrating the embodiment of FIG. 7 draped over a tree limb for hanging a game animal.

A slightly modified game drag 10A is illustrated in FIGS. 7 and 8, and is generally similar to the game drag 10 described heretofore and generally similar parts will be identified by generally similar reference characters followed by the letter A subscript.

The game drag 10A differs from the game drag 10 in that the handle 60 coupled to the free rope end 30A, includes a J-shaped hook coupled to the terminal drag end 30A. The hook 60 may suitably comprise a C-shaped or J-shaped hook as illustrated.

The line 20A includes a third loop 62 which is formed by folding another portion 61 of the line 20A and tying it to itself, via a knot 64 to form the loop 62 as illustrated. The line portion 61 is disposed between the drag end portion 48A forming the variable size loop 43A. The hook 60 is passed over a tree limb or other vertical support, generally designated 64 as illustrated in FIG. 8, and the hook 60 is detachably received in the passage 63 provided in the loop 62 as illustrated in FIG. 8 to hang the deer from the tree limb 64.

Second Alternate Embodiment

Figure 9:
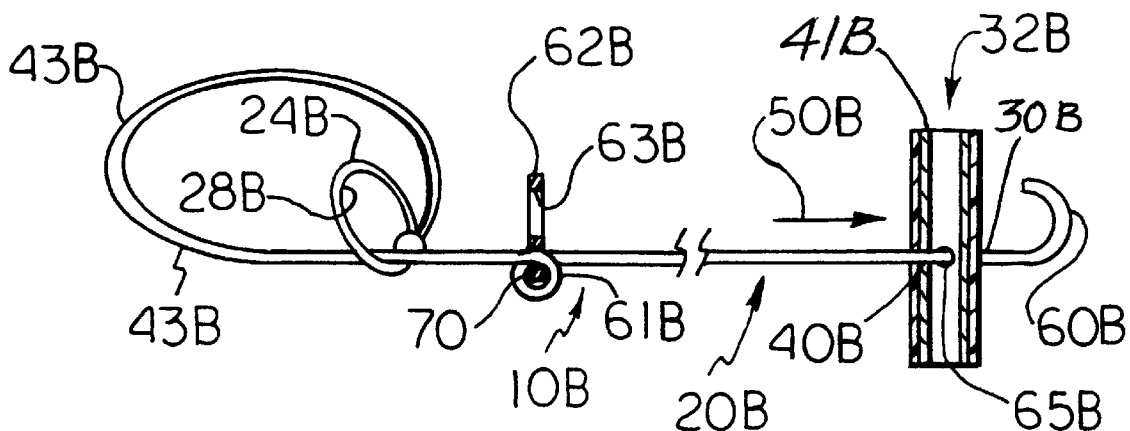
FIG. 9 is a side perspective view of another further slightly modified embodiment.

A further modified deer drag 10B is illustrated in FIG. 9 and is generally similar to the deer drag illustrated in FIGS. 1–8 and generally similar parts will be referred to by generally similar reference characters followed by the letter B. Instead of an integral loop 62 being formed in the line 20A, the device 10B includes a flat washer 62B having an opening 63B therein which is coupled to the portion 61B of the rope 20B via a second aperture 70 provided in the washer 62B.

The terminal line end 30B passes through a second opening 65B in the sidewall 41B of handle 32B and coupled to a J-shaped hook 60B which will pass receive the handle 32B when force, in the direction of the arrow 50B, is applied to handle 32B. When the game animal reaches the desired location, the handle 32B is moved away from the J-shaped hook 60B to the position shown in FIG. 9 and then passed over a vertical support and coupled to the washer 62B to hang the animal.

It is to be understood that the drawings and descriptive matter are in all cases to be interpreted as merely illustrative of the principles of the invention, rather than as limiting the same in any way, since it is contemplated that various changes may be made in various to achieve like results without departing from the spirit of the invention or the scope of the appended claims.

What I claim is:

1. A game drafting device for dragging a game animal comprising:
    a flaccid draft line having
        a first end,
        a second end, and
        an intermediate portion between said ends; said first end including
        endless snout loop means, defining a passage, for receiving the snout of an animal to be drawn;
        said intermediate portion, adapted to pass around the neck of a game animal to be dragged, slidably received by said passage in said snout loop means; and
    draft handle means coupled to said second end for applying draft tension force to said line for drawing said intermediate portion through said passage in said snout loop means.

2. The game drafting device set forth in claim 1 wherein said handle means comprises a hollow tube including a hollow cylinder, coupled to said second end, having an internal passage therein and an outer surface; and a layer of yieldable material coating said outer surface.

3. The game drafting device set forth in claim 2 wherein said handle means comprises a hollow cylinder including an annular sidewall defining an internal passage therein, having an opening therein communicating with said passage, said second end passing through said opening and being disposed in said passage.

4. The game drafting device set forth in claim 3 wherein said aperture has a predetermined breadth, said second end is folded over on itself and tied into a knot which has a greater predetermined breadth greater than said predetermined breadth to preclude said second end from passing through said aperture.

5. The game drafting device set forth in claim 4 wherein said line comprises a rope.

6. The game drafting device is set forth in claim 1, including additional receptacle means on said intermediate portion of said draft line forming a receptacle, said handle means including a hook adapted to pass over a support member and be detachably received by said receptacle for hanging said game animal.

7. The game drafting device set forth in claim 6 wherein said handle means comprises a J-shaped hook.

8. The game drafting device set forth in claim 7 wherein said additional receptacle means comprises a receptacle coupled to another portion of said line.

9. The game drafting device set forth in claim 8 wherein said receptacle comprises a loop forming member, and means for mounting said loop forming member on a section of said intermediate portion which is not received by said passage in said snout loop means and does not pass around the neck of a game animal.

10. A method of mounting a drag device on a game animal comprising the steps of:
    forming an endless snout receiving loop in one end of a flexible draft line;
    forming a neck receiving loop, which is variable in size, by passing an opposite end of said line through said endless snout receiving loop:

mounting said endless snout receiving loop on the snout of an animal; and mounting said neck receiving loop around a portion of the neck of an animal to be dragged.

11. The method set forth in claim 10 further including the step of passing said opposite end of said line over a support and detachably coupling it to a third loop coupled to an intermediate portion of said line intermediate said one end and said opposite end.

12. The method set forth in claim 11 wherein said step of forming said snout receiving loop is accomplished before said step of forming said neck receiving loop.

13. The method set forth in claim 12 wherein said step of mounting said snout receiving loop is accomplished after said step of forming said neck receiving loop.

14. The method set forth in claim 11 wherein said step of forming said neck receiving loop is accomplished by passing an intermediate portion of said line between said ends around the neck of an animal to be dragged and thereafter passing said opposite end of said line through said snout receiving loop.

15. The method set forth in claim 10 including the step of varying the size of said neck receiving loop by applying tension force to said opposite end of said line.

16. A game dragging device comprising:
a flaccid drag line having
a drag end adapted to be pulled, to apply tensile drag force to said line;
a first line portion for passing around a first part of an animal to be moved; and
a second snout lifting line portion;
said second snout lifting line portion including endless snout lift means, defining an endless band for receiving a snout portion of an animal, for lifting the snout of the animal relative to said first part of the animal as said drag end is pulled to apply drag force to said line to drag an animal;
said first line portion for passing around a first part of an animal to be moved being disposed between said drag end and said second snout lifting line portion and being slidably received in said opening of said snout loop for forming a second variable size loop for passing around said first part of an animal to be moved.

17. The game dragging device set forth in claim 16 including hanging hook means on said drag end for passing around a support and detachably hooking to a portion of said drag line adjacent said drag end.

18. The game dragging device set forth in claim 17 wherein said portion of said line adjacent said drag end includes third loop forming means on said line forming a third hook receiving loop; said hanging hook means comprises a hook coupled to said drag end and including a portion for detachably coupling to said third hook receiving loop to detachably hang said animal on said support; and further including a handle having a mid-portion and opposite hand graspable end portions; and means coupling said mid-portion to said drag end.

19. A game drafting device for dragging a game animal having a head provided with a snout, said game drafting device comprising:
a flaccid game dragging member having a first portion for coupling to a first portion of a game animal and a manually graspable end for applying tension to said flaccid member to drag an animal; and
head lifting means on said flaccid member, adapted to being received on another head portion of an animal, for elevating the head of an animal as it is dragged by said flaccid member; said head lifting means comprising a fixed endless snout loop closed on itself defining an opening therein for receiving the snout of an animal, said first portion of said flaccid member passing through said opening; said flaccid member including a second end and an intermediate portion between said ends; said head lifting means including said intermediate portion slidably received by said opening.

20. A game dragging device for dragging a game animal comprising:
a flaccid member including
a draft end adapted to be pulled to apply tension to said flaccid member,
an opposite end having an endless snout loop formed therein for receiving the snout of a game animal; and
an intermediate portion for passing around a portion of a game animal and slidably received by said endless snout loop.

21. A game drag for dragging a game animal having a neck and a head thereon provided with a snout, said game drag comprising:
a flaccid draft line including
first loop forming means for forming a first loop for passing around the neck of a game animal, and
second loop forming means for forming a second endless loop for receiving the snout of an animal to be dragged; and
handle means coupled to said line for applying tension to said line to drag said game animal; said loop forming means for forming said first loop including a portion slidably received by said second loop.

22. The game drag set forth in claim 21 wherein said flaccid draft line includes means for elevating the head of a game animal in response to tension being applied to said draft line to drag an animal secured to said line.

23. The game drag set forth in claim 21 wherein said second loop is fixed in size and said first loop is adjustable in size in response to tension being applied to said line by said handle means.

24. The game drag set forth in claim 21 wherein said second loop has a first opening therein of a predetermined size and said first loop has a second adjustable opening therein of a substantially greater predetermined size greater than said predetermined size.

25. A game dragging device for dragging a game animal including a neck, head and snout, said game dragging device comprising:
a flexible draft line having
a first draft end,
a second end having a minor, closed snout receiving loop means therein for detachably receiving the snout of an animal to be dragged, and
an intermediate portion between said ends forming a major, neck receiving loop means therein for detachably receiving the neck of an animal to be dragged;
said minor, closed snout receiving loop means being fixed in size; said major, neck receiving loop means being adjustable in size in response to tension being applied thereto;

a portion of said major, neck receiving loop means being slidably received by said minor, snout receiving loop means.

26. A game drafting device for dragging a game animal comprising:
- a flaccid draft line having
  - a first end,
  - a second end, and
  - an intermediate portion between said ends;
- said first end including
  - endless snout loop means, defining an endless fixed band having a passage therein, for receiving the snout of an animal to be drawn;
- said intermediate portion, adapted to pass around the neck of a game animal to be dragged, slidably received by said passage in said snout loop means; and
- draft handle means coupled to said second end for applying draft tension force to said line for drawing said intermediate portion through said passage in said snout loop means;
- said intermediate portion cooperating with said snout loop means to form an adjustable loop which varies in size in response to draft tension force being applied thereto by said handle means to draw said intermediate portion through said passage in said snout loop means.

* * * * *